United States Patent
Koshiko et al.

(10) Patent No.: US 12,300,410 B2
(45) Date of Patent: May 13, 2025

(54) HEXAGONAL FERRITE MAGNETIC POWDER AND METHOD FOR PRODUCING SAME

(71) Applicant: DOWA ELECTRONICS MATERIALS CO., LTD., Tokyo (JP)

(72) Inventors: Masaki Koshiko, Tokyo (JP); Akifumi Onodera, Tokyo (JP); Hirohisa Omoto, Tokyo (JP)

(73) Assignee: DOWA ELECTRONICS MATERIALS CO., LTD., Tokyo (JP)

(*) Notice: Subject to any disclaimer, the term of this patent is extended or adjusted under 35 U.S.C. 154(b) by 33 days.

(21) Appl. No.: 17/795,585

(22) PCT Filed: Mar. 18, 2021

(86) PCT No.: PCT/JP2021/011223
§ 371 (c)(1),
(2) Date: Jul. 27, 2022

(87) PCT Pub. No.: WO2021/193382
PCT Pub. Date: Sep. 30, 2021

(65) Prior Publication Data
US 2023/0081863 A1 Mar. 16, 2023

(30) Foreign Application Priority Data
Mar. 26, 2020 (JP) ................. 2020-056824

(51) Int. Cl.
*H01F 1/34* (2006.01)
*C01G 49/00* (2006.01)
*H01F 1/36* (2006.01)

(52) U.S. Cl.
CPC ......... *H01F 1/348* (2013.01); *C01G 49/0036* (2013.01); *C01P 2002/52* (2013.01); *C01P 2002/76* (2013.01); *C01P 2006/42* (2013.01)

(58) Field of Classification Search
CPC ... H01F 1/348; H01F 1/36; H01F 1/11; G11B 5/706; G11B 5/714; G11B 5/70678; C01G 49/0036; C01P 2002/52; C01P 2002/76; C01P 2002/60; C01P 2006/42; C01P 2006/12
See application file for complete search history.

(56) References Cited

U.S. PATENT DOCUMENTS

2012/0199782 A1* 8/2012 Masada ............ G11B 5/70678
252/62.63

FOREIGN PATENT DOCUMENTS

| JP | 2011-178654 | 9/2011 |
| JP | 2011-181130 | 9/2011 |
| JP | 2015-111484 | 6/2015 |
| JP | 2016-139451 | 8/2016 |
| JP | 2016-171264 | 9/2016 |
| WO | 2011/048823 | 4/2011 |
| WO | 2011/125633 | 10/2011 |

OTHER PUBLICATIONS

Machine translation of JP2016171264A, 16 pages. (Year: 2016).*

* cited by examiner

*Primary Examiner* — Matthew E. Hoban
*Assistant Examiner* — Lynne Edmondson
(74) *Attorney, Agent, or Firm* — Christopher W. Brody; Millen, White, Zelano & Branigan, P.C.

(57) ABSTRACT

A hexagonal ferrite magnetic powder is significantly more useful for achieving simultaneously both the enhancement of the recording density and the enhancement of the SNR of a magnetic recording medium. The hexagonal ferrite magnetic powder contains Bi at a Bi/Fe molar ratio in a range of 0.035 or less, has a saturation magnetization σs of 42.0 Am²/kg or more and a Dx volume calculated based on the crystallite diameters of 1,800 nm³ or less. A method for producing hexagonal ferrite magnetic powder includes a step of performing a treatment of immersing hexagonal ferrite magnetic powder containing Bi in a solution having dissolved therein a compound X that forms a complex with Bi, so as to elute a part of Bi existing in the hexagonal ferrite magnetic powder into the solution.

4 Claims, 1 Drawing Sheet

//HEXAGONAL FERRITE MAGNETIC POWDER AND METHOD FOR PRODUCING SAME

TECHNICAL FIELD

The present invention relates to magnetoplumbite type (M type) hexagonal ferrite magnetic powder suitable for high density recording of a magnetic recording medium, and a method for producing the same.

BACKGROUND ART

As magnetic powder suitable for high density recording used in a magnetic recording medium, M type hexagonal ferrite magnetic powder has been known. From the standpoint of the enhancement of the recording density, the refinement of the magnetic particles (i.e., the reduction of the Dx volume described later) is advantageous. On the other hand, from the standpoint of the enhancement of the SNR (S/N ratio) of the recording medium, the thinning of the magnetic layer is advantageous. For securing a high recording density even with a thin magnetic layer, it is necessary to increase the saturation magnetization σs of the magnetic powder. However, it is not easy to retain a high saturation magnetization σs while attempting the significant refinement of the magnetic particles.

PTL 1 describes, as ferrite magnetic powder capable of achieving high magnetic characteristics even though having a small particle volume, hexagonal ferrite magnetic powder containing iron, a divalent metal, a tetravalent metal, Ba, Bi, and a rare earth element, having a content of Bi that is larger than the content of the rare earth element. The literature describes that the addition of Bi can reduce sintering among the particles of hexagonal ferrite, which can be thus reduced in diameter.

PTL 2 describes, as magnetic powder capable of achieving simultaneously both the enhancement of the magnetic characteristics including SNR of a magnetic recording medium and the enhancement of the durability thereof, hexagonal ferrite magnetic powder having a Ba/Fe molar ratio of 8.0% or more (0.080 or more), a Bi/Fe molar ratio of 2.5% or more (0.025 or more), and an Al/Fe molar ratio of 3.0 to 6.0% (0.030 to 0.060).

PTL 3 describes hexagonal Ba ferrite magnetic powder having an Fe site valence XFe of 3.005 to 3.030, an R/M molar ratio (wherein M represents Fe and a substitution element thereof) of 0.001 to 0.020, and a Dx volume of 1,150 to 1,450 nm$^3$. The magnetic powder intends to improve the magnetic characteristics (particularly the S/N ratio) of a magnetic recording medium by a method of sharpening the distribution of the coercive force Hc of the magnetic powder formed of fine magnetic particles. The literature describes that Bi is effective for the reduction of the particle size and the enhancement of the magnetic characteristics (PTL 3, paragraph 0023).

CITATION LIST

Patent Literatures

PTL 1: JP-A-2011-178654
PTL 2: JP-A-2015-111484
PTL 3: JP-A-2016-171264

SUMMARY OF INVENTION

Technical Problem

For achieving the refinement of the magnetic particles (i.e., the reduction of the Dx volume described later) of hexagonal ferrite powder, it is effective to decrease the firing temperature in crystallization. However, in the case where the refinement is achieved to a level with a Dx volume, for example, of approximately 2,000 nm$^3$ or less by decreasing the firing temperature, there is a problem that the saturation magnetization σs is largely decreased. The addition of Bi is effective for relieving the problem. Specifically, by adding Bi to the raw material mixture for producing hexagonal ferrite in an appropriate amount (for example, 0.005 or more in terms of Bi/Fe ratio), even in the case where the Dx volume is controlled, for example, to 2,000 nm$^3$ or less by decreasing the firing temperature in firing the amorphous material of the raw material mixture for crystallization, the extent of decrease of σs caused by the decrease of the firing temperature can be reduced. However, even in this case, the σs high as that is inherently exhibited by hexagonal ferrite crystals synthesized at a sufficiently high firing temperature cannot be obtained. There is an increasing demand of the further enhancement of the capability of a magnetic recording medium in recent years. The method of adding Bi as described above cannot sufficiently meet the demand.

In view of the needs of the further enhancement of the capability of a magnetic recording medium, an object of the present invention is to provide hexagonal ferrite magnetic powder that is significantly useful for achieving simultaneously both the enhancement of the recording density and the enhancement of the SNR. Another object thereof is to provide a production technique that is effective for providing the hexagonal ferrite magnetic powder.

Solution to Problem

For achieving the objects, the following inventions are described in the description herein.

[1] Hexagonal ferrite magnetic powder containing Bi at a Bi/Fe molar ratio in a range of 0.035 or less, having a saturation magnetization σs of 42.0 Am$^2$/kg or more and a Dx volume represented by the following expression (1) of 1,800 nm$^3$ or less:

$$Dx\ \text{volume}(nm^3) = Dxc \times \pi \times (Dxa/2)^2 \qquad (1)$$

wherein Dxc represents a crystallite diameter (nm) of a hexagonal ferrite crystal lattice in a c axis direction; Dxa represents a crystallite diameter (nm) of the crystal lattice in an a axis direction; and π represents the circular constant.

[2] The hexagonal ferrite magnetic powder according to the item [1], wherein the hexagonal ferrite magnetic powder contains Bi at a Bi/Fe molar ratio in a range of 0.005 to 0.035.

[3] The hexagonal ferrite magnetic powder according to the item [1] or [2], wherein a part of Fe sites of hexagonal ferrite crystals is substituted by one or more kind of a divalent, tetravalent, or pentavalent metal element.

[4] The hexagonal ferrite magnetic powder according to any one of the items [1] to [3], wherein the hexagonal ferrite magnetic powder is hexagonal Ba ferrite magnetic powder.

[5] A method for producing hexagonal ferrite magnetic powder, including a step of performing a treatment of immersing hexagonal ferrite magnetic powder containing Bi in a solution having dissolved therein a compound X that forms a complex with Bi, so as to elute a part of Bi existing in the hexagonal ferrite magnetic powder into the solution (which is hereinafter referred to as a "Bi elution treatment").

[6] The method for producing hexagonal ferrite magnetic powder according to the item [5], wherein the compound X is a chelating agent.

[7] The method for producing hexagonal ferrite magnetic powder according to the item [6], wherein the chelating agent satisfies the following expression (2):

$$\log K_{Bi} - \log K_{Fe} \geq 0.5 \quad (2)$$

wherein $K_{Bi}$ represents a chelate stability constant for $Bi^{3+}$, and $K_{Fe}$ represents a chelate stability constant for $Fe^{3+}$.

[8] The method for producing hexagonal ferrite magnetic powder according to any one of the items [5] to [7], wherein assuming that the hexagonal ferrite magnetic powder to be subjected to the Bi elution treatment is referred to as "original powder", and the hexagonal ferrite magnetic powder obtained through the Bi elution process is referred to as "treated powder", the original powder having a Dx volume represented by the expression (1) of 1,800 $nm^3$ or less and a Bi/Fe molar ratio of 0.020 to 0.100 is used, and a Bi residual ratio defined by the following expression (3) is allowed to be 0.2 to 0.8:

$$\text{Bi residual ratio} = (\text{Bi/Fe molar ratio of treated powder})/(\text{Bi/Fe molar ratio of original powder}) \quad (3)$$

[9] The method for producing hexagonal ferrite magnetic powder according to any one of the items [5] to [8], wherein pH of the solution during the Bi elution treatment is 2.0 to 10.0.

[10] The method for producing hexagonal ferrite magnetic powder according to any one of the items [5] to [9], wherein the Bi elution treatment is performed under condition where a total amount $A_K$ (mol) of the compound X used in the Bi elution treatment and an amount $A_{Bi}$ (mol) of Bi contained in the hexagonal ferrite magnetic powder subjected to the Bi elution treatment satisfy the following expression (4):

$$N \times A_K / A_{Bi} \geq 1.0 \quad (4)$$

wherein N represents a maximum number of atoms of Bi to which one molecule of the compound X is capable of coordinating.

[11] The method for producing hexagonal ferrite magnetic powder according to any one of the items [5] to [10], wherein in the hexagonal ferrite magnetic powder subjected to the Bi elution treatment, a part of Fe sites of hexagonal ferrite crystals is substituted by one or more kind of a divalent, tetravalent, or pentavalent metal element.

[12] The method for producing hexagonal ferrite magnetic powder according to any one of the items [5] to [11], wherein the hexagonal ferrite magnetic powder subjected to the Bi elution treatment is hexagonal Ba ferrite magnetic powder.

Advantageous Effects of Invention

According to the present invention, the saturation magnetization σs of hexagonal ferrite magnetic powder containing magnetic particles having a small size can be significantly enhanced. The use of the magnetic powder in a magnetic recording medium is advantageous for the enhancement of the recording density owing to the small size of the magnetic particles, and is also advantageous for the enhancement of the SNR since the magnetic layer can be thin owing to the high saturation magnetization σs. Accordingly, the present invention contributes to the enhancement of the capability of a magnetic recording medium.

DESCRIPTION OF EMBODIMENTS

The hexagonal ferrite targeted in the present invention is of a magnetoplumbite type (M type) having a chemical formula $AO \cdot 6Fe_2O_3$ as the basic structure. The element A in the chemical formula is one or more kind of Ba, Sr, Pb, and Ca, and there are types where a part thereof is substituted by La or the like. A part of the Fe sites may be substituted by one or more kind of a divalent, tetravalent, or pentavalent metal element. Examples of the divalent metal element include Co and Zn, examples of the tetravalent metal element include Ti and Sn, and examples of the pentavalent metal element include Nb and V. These metal elements substituting a part of the Fe sites each are referred to as an "Fe site substitution element". The substitution of these metal element enables control of the coercive force Hc.

The hexagonal ferrite powder targeted in the present invention contains Bi. Bi is not an element that constitutes the crystal structure of hexagonal ferrite (i.e., an element that constitutes any of the atomic sites of the chemical formula $AO \cdot 6Fe_2O_3$), but is an additive element effective for the refinement of the hexagonal ferrite crystal particles and the enhancement of the electromagnetic conversion characteristics of a magnetic recording medium using the magnetic powder. In particular, even in the case where the refinement of the crystal particles is to be achieved by lowering the firing temperature, an effect of reducing the deterioration of the magnetic characteristics can be obtained. While the mechanism of the useful effect of Bi has not yet been sufficiently clarified, such contributing factors can be considered, for example, that Bi contained changes the particle shape of the crystal particles constituting the hexagonal ferrite magnetic powder and the variability of the particle shape, and enhances the crystallinity of the hexagonal ferrite. For utilizing the advantages of the addition of Bi described above, hexagonal ferrite powder containing Bi is targeted in the present invention. The modified hexagonal ferrite powder obtained through the Bi elution treatment described later still contains Bi remaining in the prescribed amount.

The hexagonal ferrite powder targeted in the present invention may contain one or more kind of a rare earth element, such as Nd, Sm, Y, Er, and Ho, and Al. These elements do not constitute the crystal structure of the hexagonal ferrite.

[Modification Method of Bi-Containing Hexagonal Ferrite Magnetic Powder]

In the production method of the present invention, Bi-containing hexagonal ferrite magnetic powder synthesized by using a raw material mixture containing Bi is subjected to a treatment eluting a part of Bi contained in the powder, so as to produce modified hexagonal ferrite magnetic powder. In the description herein, the aforementioned treatment eluting a part of Bi is referred to as a "Bi elution treatment".

The hexagonal ferrite magnetic powder to be subjected to the Bi elution treatment is referred to as "original powder", and the hexagonal ferrite magnetic powder obtained through the Bi elution treatment is referred to as "treated powder". The original powder, the Bi elution treatment, and the treated powder will be described below.

[Original Powder]

The production process of the original powder applied to the present invention is preferably a glass crystallization method from the standpoint of the achievement of the hexagonal ferrite magnetic powder having a small crystal particle size and a uniform particle size distribution. The glass crystallization method is a method of crystallizing an amorphous material of the raw material mixture by firing. In the case where the glass crystallization method is used, Bi-containing hexagonal ferrite powder obtained by the known method described in PTLs 1 to 3 may be used as the original powder. The Bi source used in the glass crystallization method may be Bi oxide powder, metallic Bi powder, or the like. Other methods than the glass crystallization method may be used, as far as the method is a synthesis method capable of synthesizing hexagonal ferrite magnetic powder containing Bi. In the process of producing the hexagonal ferrite magnetic powder by the glass crystallization method, in general, for extracting the hexagonal ferrite crystal particles from the powder obtained through the crystallization process (i.e., the process of precipitating ferrite by a heat treatment), a "pickling treatment" is performed for dissolving and removing the residual substance mainly containing barium borate with an acid. In the case where hexagonal ferrite crystallized by the glass crystallization method is used, the original powder used is necessarily hexagonal ferrite magnetic powder from which the unnecessary residual substance has been sufficiently removed through the cleaning process including the pickling treatment. The known products of Bi-containing hexagonal ferrite magnetic powder capable of being used as a magnetic material for a magnetic recording medium can be used as the original powder applied to the present invention.

The Bi content range of the original powder may be a relatively small lower limit, for example, of 0.001 or more in terms of Bi/Fe molar ratio, but the original powder having a Bi/Fe molar ratio of 0.020 or more is preferably used. Hexagonal ferrite magnetic powder that contains Bi at a Bi/Fe molar ratio of 0.020 or more in the stage after the crystallization is more effective for the enhancement of the electromagnetic conversion characteristics of the magnetic recording medium since the particle shape of the crystal particles thereof and the extent of the variability of the particle shape thereof are appropriately changed, and favorable crystallinity is exhibited thereby. The original powder having a Bi/Fe molar ratio of 0.030 or more is more effectively used. However, a large amount of Hi contained in the original powder may cause an excessive amount of extra Bi remaining in the treated powder obtained after subjecting to the Bi elution treatment described later. Bi is a nonmagnetic component, and therefore it is more advantageous for the enhancement of the magnetic characteristics of the magnetic recording medium that the residual amount of extra Bi is as small as possible. The Bi content of the original powder is effectively at a Bi/Fe molar ratio in a range of 0.100 or less.

The molar ratio with respect to Fe (which may be hereinafter referred to as a "molar ratio to Fe") of the Fe site substitution element in the component elements constituting the original powder may be the same as in the target composition of the treated powder. The molar ratio to Fe of the Fe site substitution element is mostly retained before and after the Bi elution treatment. There is a tendency that the rare earth element in the component elements constituting the original powder is eluted through the Bi elution treatment. Accordingly, in the case where the treated powder necessarily contains a rare earth element in a prescribed amount, the content of the rare earth element in the original powder is determined in consideration of the eluted amount thereof in the Bi elution treatment. The extent of loss of the rare earth element in the Bi elution treatment can be comprehended in advance by performing a preliminary experiment based on the actual production condition. Al in the component elements constituting the original powder mostly retains the Al/Fe molar ratio before and after the Bi elution treatment. As for Al, a treatment of attaching Al to the particles may be performed before or after the Bi elution treatment, so as to add the whole or a part of Al necessary in the powder. In this case, the Al content in the original powder is determined in consideration of the amount of Al added through the attaching treatment. In the case where the hexagonal ferrite crystals are synthesized by the glass crystallization method, the blending composition of the raw material mixture (which may be hereinafter referred to as a "charged composition") is mostly reflected to the component composition of the synthesized hexagonal ferrite powder. Accordingly, in the case where the original powder is obtained by the glass crystallization method, the contents of the component elements in the original powder may be controlled in the charged composition.

For enhancing the recording density of the magnetic recording medium, it is advantageous that the hexagonal ferrite crystal particles are fine. As a size parameter of crystal particles, a Dx volume determined by the crystallite diameter may be used. The Dx volume is calculated according to the following expression (1).

$$Dx \text{ volume}(nm^3) = Dxc \times \pi \times (Dxa/2)^2 \qquad (1)$$

In the expression, Dxc represents the crystallite diameter (nm) of the hexagonal ferrite crystal lattice in the c axis direction; Dxa represents the crystallite diameter (nm) of the crystal lattice in the a axis direction; and it represents the circular constant.

The crystallite diameter is obtained from the half value width of the diffraction peak measured by X-ray diffractometry (XRD) using the Cu-Kα line, according to the Scherrer equation shown by the following expression (5).

$$\text{Crystallite diameter}(nm) = K\lambda/(\beta \cdot \cos \theta) \qquad (5)$$

In the expression, K represents the Scherrer constant of 0.9; λ represents the wavelength (nm) of the Cu-Kα line; R represents the half value width (radian) of the diffraction peak of the hexagonal (006) plane for the measurement of Dxc, or the half value width (radian) of the diffraction peak of the hexagonal (220) plane for the measurement of Dxa; and θ represents the Bragg angle (½ of the diffraction angle 2θ) (radian) of the diffraction peak.

According to the investigations by the present inventors, the use of hexagonal ferrite magnetic powder having a Dx volume of 1,800 $nm^3$ or less as the original powder is expected to provide a significantly high effect on the enhancement of the SNR of the magnetic recording medium using the treated powder having been subjected to the Bi elution treatment, in addition to the enhancement of the recording density thereof owing to the small Dx volume. The lower limit of the Dx volume may not be necessarily restricted, and in the case where the coercive force of the magnetic powder is important, the Dx volume of the original powder is preferably 1,000 nm$^3$ or more, and more preferably 1,300 nm$^3$ or more.

[Bi Elution Treatment]

As described above, Bi is effective for the refinement of hexagonal ferrite crystal particles and the enhancement of the electromagnetic conversion characteristics of the magnetic recording medium using the magnetic powder, and also has an effect of reducing the deterioration of the magnetic characteristics even in the case where the refinement of the crystal particles is to be achieved by lowering the firing temperature. The useful function of Bi is exhibited by Bi allowed to exist in the raw material at the time of formation of crystals of hexagonal ferrite. The Bi that has exhibited the aforementioned function at the time of synthetic of crystals still exists in the hexagonal ferrite magnetic powder thereafter. Bi is a non-magnetic component, and therefore it is considered that the decrease of the content of extra Bi existing in the magnetic powder is effective for the enhancement of the magnetic characteristics. The present inventors have accumulated investigations on the removal method of the extra Bi existing in hexagonal ferrite magnetic powder. As a result, it has been found that a "wet treatment" of immersing the Bi-containing hexagonal ferrite magnetic powder in a solution having dissolved therein a compound that forms a complex with Bi (in the description herein, the compound that forms a complex with Bi is referred to as a "compound X") performed can largely decrease the content of Bi existing in the magnetic powder while suppressing the elution of Fe and the substitution metal element thereof as much as possible. Furthermore, it is also confirmed that the saturation magnetization σs of the magnetic powder is increased associated with the significant decrease of the Bi content. Accordingly, the treatment of immersing the Bi-containing hexagonal ferrite magnetic powder in the solution having dissolved therein the compound X is applied as the Bi elution treatment to the method for producing the modified hexagonal ferrite magnetic powder according to the present invention. Bi contained in the hexagonal ferrite magnetic powder cannot be eluted by the pickling treatment described above, which is generally performed in the production of hexagonal ferrite magnetic powder by the glass crystallization method. Furthermore, in the case where a strong acid, such as hydrochloric acid or sulfuric acid, is mixed with the hexagonal ferrite magnetic powder, it is difficult to elute only Bi selectively since the strong acid dissolves not only Bi but also the ferrite crystals.

The present inventors have made comparative investigations between the total Bi content in the magnetic powder obtained through chemical analysis and the Bi concentration in the surface layer part of the powder particles obtained through XPS (X-ray photoelectron spectroscopy), for the ordinary products of Bi-containing hexagonal ferrite magnetic powder, which is subjected to a cleaning treatment sufficiently in the cleaning process including the pickling treatment described above, and in the usable state as a magnetic material of a magnetic recording medium. It has been found from the investigations that there is a tendency that Bi existing in the Bi-containing hexagonal ferrite magnetic powder is locally distributed to the surface layer part of the magnetic crystal particles. In other words, it can be stated that the individual magnetic crystal particles of the Bi-containing hexagonal ferrite powder each are coated with a Bi-concentrating layer. It is considered that the mechanism of the significant decrease of the Bi content of the magnetic powder by immersing the Bi-containing hexagonal ferrite magnetic powder in the solution having dissolved therein the compound X is that Bi existing in a larger amount in the surface layer part of the particles is eluted to the solution through formation of a metal complex of Bi with the compound X. The compound X is capable of coordinating not only to Bi but also to metal elements, such as Fe. However, since Bi is concentrated in the surface layer part of the magnetic crystal particles, Bi in the surface layer part is preferentially bonded to the compound X molecule and eluted by immersing the magnetic powder in the solution of the compound X, the Bi content can be largely decreased while substantially retaining the particle shape and the Dx volume of the hexagonal ferrite crystals and the blended composition of the elements constituting the crystal structure of the hexagonal ferrite (e.g., Ba, Fe, and the Fe site substitution element). The effect of the Bi elution treatment can be obtained irrespective of the kind of the element constituting the sites of the element A, the kind of the substitution element of the Fe sites, the kind of the rare earth element, and the presence or absence of Al contained, as far as the Bi-containing hexagonal ferrite magnetic powder having a chemical formula AO·6Fe$_2$O$_3$ as the basic structure is used as the original powder.

The decrease of the content of Bi concentrated to the surface layer part of the particle through the Bi elution treatment is effective for the enhancement of the magnetic characteristics. Therefore, it can be stated that the Bi elution treatment is generally effective for the enhancement of the capability of a magnetic recording medium irrespective of the size of the crystal particles. On the other hand, hexagonal ferrite magnetic powder having fine crystal particles tends to undergo the decrease of the saturation magnetization σs as described above, but the decrease of σs of such an extent that causes problems in the hexagonal ferrite magnetic powder having fine crystal particles has been suppressed by adding Bi. Accordingly, by subjecting the Bi-containing hexagonal ferrite magnetic powder having fine crystal particles used as the original powder to the Bi elution treatment, the synergistic effect can be obtained from the effect of suppressing the decrease of as described above and the effect of increasing as by the Bi elution treatment, and thus can achieve as at such a high level that has been difficult to achieve with hexagonal ferrite magnetic powder having fine crystal particles. Specifically, a saturation magnetization as of 42.0 Am$^2$/kg or more can be stably obtained with hexagonal ferrite magnetic powder having a Dx volume of 1,800 nm$^3$ or less.

[Compound X Forming Complex with Bi]

Examples of the compound X having a capability of forming a complex with Bi include various chelating agent, and also include lactic acid and thiourea.

A chelating agent is a water soluble compound having a capability of coordinating to a metal ion, such as an alkaline earth metal and a transition metal, so as to form a chemically extremely stable chelate complex. In the present invention, known chelating agents, such as ethylenediaminetetraacetic acid (EDTA), trans-1,2-acid cyclohexanediaminetetraacetic (CyDTA), diethylenetriaminepentaacetic acid (DTPA), hydroxyethylenediaminetriacetic acid (EDTA-OH), glycol ether diaminetetraacetic acid (GEDTA), and alkali metal salts thereof, and the chemical species thereof are not particularly limited. EDTA, mono- to tetrasodium salts of EDTA, and mono- to tetrapotassium salts of EDTA are preferred from the standpoint of the availability and the cost. A chelating agent solution containing two or more kinds of chelating agents dissolved therein may be used.

The chelate stability constant K showing the stability of a chelate complex in liquid is represented by the following expression (6).

$$K=[M_XL]/([M]^N[L]) \quad (6)$$

In the expression, [L] represents the molar concentration of the chelating agent molecule; [M] represents the molar concentration of the metal ion; N represents the molar number of the metal ion M to which 1 mol of the chelating agent molecule coordinates; and [$M_N$L] represents the molar concentration of the chelate complex [$M_N$L] molecule in the liquid. With a larger chelate stability constant K, the stability of the chelate complex is evaluated as better. In the description herein, the chelate stability constants K for $Bi^{3+}$ and $Fe^{3+}$ are shown by $K_{Bi}$ and $K_{Fe}$, respectively.

For comparing the stability of chelate complexes in liquid, common logarithms of the chelate stability constants K have been frequently used. The chelate stability constants K of the representative chelating agents for various metal ions have been investigated, from which the values of log $K_{Bi}$ and log $K_{Fe}$ can be known. The values of log $K_{Bi}$ and log $K_{Fe}$ of the aforementioned chelating agents are exemplified in Table 1.

TABLE 1

| Chelating agent | Abbreviation | Logarithm of chelate stability constant | | $\log K_{Bi}$ − $\log K_{Fe}$ |
|---|---|---|---|---|
| | | $\log K_{Bi}$ | $\log K_{Fe}$ | |
| ethylenediamine-tetraacetic acid | EDTA | 27.9 | 25.1 | 2.8 |
| trans-1,2-cyclohexane-diaminetetraacetic acid | CyDTA | 31.2 | 28.1 | 3.1 |
| diethylenetriamine-pentaacetic acid | DTPA | 29.7 | 28.6 | 1.1 |
| hydroxyethylene-diaminetriacetic acid | EDTA-OH | 21.8 | 19.8 | 2.0 |
| glycol ether diamine-tetraacetic acid | GEDTA | 23.8 | 20.5 | 3.3 |

In the case where a chelating agent is used as the compound X in the production method of the present invention, it is advantageous to use a chelating agent having a chelate stability constant to a Bi ion that is larger than the chelate stability constant to an Fe ion, from the standpoint of the prevention of dissolution of the hexagonal ferrite crystals in the Bi elution treatment. As a result of the various investigations, it is preferred to use a chelating agent that satisfies the following expression (2).

$$\log K_{Bi} - \log K_{Fe} \geq 0.5 \quad (2)$$

In the expression, $K_{Bi}$ represents the chelate stability constant for $Bi^{3+}$, and $K_{Fe}$ represents the chelate stability constant for $Fe^{3+}$.

A chelating agent that satisfies the following expression (2)' is more preferred, and a chelating agent that satisfies the following expression (2)" is further preferred.

$$\log K_{Bi} - \log K_{Fe} \geq 1.0 \quad (2)'$$

$$\log K_{Bi} - \log K_{Fe} \geq 2.0 \quad (2)''$$

It is more effective to use a chelating agent having log $K_{Bi}$ of 20.0 or more.

(Treatment Condition)

The pH of the solution during the Bi elution treatment is preferably retained in a range of 2.0 to 10.0, and more preferably retained in a range of 3.0 to 9.0. With a too low pH of the solution, the solubility of the hexagonal ferrite crystals may be increased. With a too high pH of the solution, the Bi elution capability of the compound X may be lowered. The pH can be regulated by adding an acid, such as acetic acid and sulfuric acid, or an alkali, such as sodium hydroxide, to the compound X solution. The value of pH referred to in the description herein means a value that is measured according to JIS Z8802 with a pH meter calibrated with a suitable buffer solution corresponding to the pH region to be measured as the pH standard solution. The value of pH referred to in the description herein is a value that is obtained by directly reading a measured value shown by a pH meter compensated with a temperature compensation electrode, under the elution temperature condition.

For industrially practicing the Bi elution treatment, it is advantageous to increase the elution rate of Bi sufficiently, and therefore the quantitative relationship between the compound X and the original powder in the Bi elution treatment is preferably condition satisfying the following expression (4).

$$N \times A_k/A_{Bi} \geq 1.0 \quad (4)$$

In the expression, $A_k$ represents the total amount (mol) of the compound X (e.g. chelating agent) used in the Bi elution treatment; $A_{Bi}$ represents the amount (mol) of Bi contained in the hexagonal ferrite magnetic powder subjected to the Bi elution treatment; and N represents a maximum number of atoms of Bi to which one molecule of the compound X is capable of coordinating.

The upper limit of the left member of the expression (4) may not be particularly determined since the upper limit is restricted by the solubility of the compound X and the like, and examples thereof include condition satisfying the following expression (4)'.

$$100 \geq N \times A_k/A_{Bi} \geq 1.0 \quad (4)'$$

The chelating agents shown in Table 1 each have a value N of 1.

For sufficiently exhibiting the effect of enhancing the magnetic characteristics by decreasing the Bi content, it is advantageous to perform the Bi elution treatment in such a manner that the Bi residual ratio defined by the following expression (3) is 0.2 to 0.8.

Bi residual ratio=(Bi/Fe molar ratio of treated powder)/(Bi/Fe molar ratio of original powder) (3)

In the case where the original powder having a Dx volume of 1,800 $nm^3$ or less described above and a Bi/Fe molar ratio of 0.020 to 0.100 is used, and the Bi elution treatment is performed in such a manner that the Bi residual ratio is 0.2 to 0.8, in particular, a high saturation magnetization σs that has been difficult to achieve ordinarily in a small Dx volume region can be realized.

In the Bi elution treatment, the liquid medium used in the solution having dissolved therein the compound X (i.e., the compound X solution) may be generally water. A mixed liquid medium of water and a solvent substance other than water (for example, an alcohol, such as ethanol) may also be used depending on necessity. The solution during the Bi elution treatment may contain a substance other than the compound X, the acid or alkali for regulating the pH, and the original powder, unless the effects of the present invention are impaired.

The temperature of the solution during the Bi elution treatment may be set, for example, to a range of 10 to 90° C. The temperature is more preferably set to a range of 40 to 90° C. from the standpoint of the enhancement of the elusion rate of Bi. The concentration of the compound X in the compound X solution may be set, for example, to a range of 0.001 to 0.2 mol/kg in terms of molality of the compound X with respect to the total amount of the liquid medium (e.g., water or a mixed liquid of water and another solvent substance) and the compound X. The amount of the original powder to be immersed in the solution in the Bi elution treatment may be set, for example, to a range of 1.0 to 50.0% by mass in terms of mass ratio of the original powder with respect to the total amount of the compound X solution and the original powder.

In the production method of the present invention, the procedure of immersing the hexagonal ferrite magnetic powder containing Bi (i.e., the original powder) in the compound X solution is not particularly determined, as far as the mixed state can be secured to make the particles of the original powder into contact with the compound X solution. The order of adding substances to the solution is not particularly limited. Examples of the specific procedure include a method of placing the original powder into the compound X solution, a method of adding the compound X solution into a vessel having the original powder housed therein, and a method of making a state of the original powder impregnated with the liquid medium, such as water, and then adding the compound X into the liquid.

The Bi elution treatment may be repeatedly performed multiple times. Specifically, the solid matter recovered from the slurry after completing the Bi elution treatment may be subjected depending on necessity to cleaning with pure water and drying, and then again subjected to the Bi elution treatment by immersing in a solution having dissolved therein the compound X. In this case, the kinds of the compounds X used in each of the Bi elution treatments may be the same as or different from each other.

[Treated Powder]

The hexagonal ferrite magnetic powder having a decreased Bi content (i.e., the treated powder) can be obtained through the Bi elution treatment described above. In particular, hexagonal ferrite magnetic powder containing Bi at a Bi/Fe molar ratio in a range of 0.035 or less, having a saturation magnetization $\sigma s$ of 42.0 $Am^2/kg$ or more and a Dx volume of 1,800 $nm^3$ or less can be stably produced. Such hexagonal ferrite magnetic powder exhibiting a high saturation magnetization σs irrespective of the small crystal particle size thereof is significantly useful for achieving both the high density recording and the high SNR of the magnetic recording medium at a high level. It is considered that Bi contained in the treated powder is prevented from being concentrated in the surface layer part of the crystal particles, and most of Bi is incorporated into and exists in the interior of the crystal particles. It is considered that this existence form of Bi effectively functions for retaining the good crystallinity of the hexagonal ferrite and contributes to the enhancement of the magnetic characteristics. The Bi/Fe molar ratio of the treated powder may be suppressed to 0.025 or less.

As examples of the preferred target contents of the component elements other than Bi in the treated powder, the Fe site substitution element is preferably 0.001 to 0.060 in terms of [total content (mol) of Fe site substitution element]/[Fe content (mol)]. In the case where one or more kind of a rare earth element is contained, the R/Fe molar ratio is preferably 0.001 to 0.010, wherein R represents the rare earth element. In the case where Al is contained, the Al/Fe molar ratio is preferably 0.001 to 0.050.

EXAMPLES

Control Example

The original powder to be subjected to the Bi elution treatment was produced and investigated for the characteristics thereof.

As raw materials, 661.5 g of boric acid $H_3BO_3$ (industrial use), 1,285.1 g of barium carbonate $BaCO_3$ (industrial use), 765.9 g of iron oxide $Fe_2O_3$ (industrial use), 14.4 g of cobalt oxide CoO (reagent 90% or more), 15.3 g of titanium oxide $TiO_2$ (first class reagent), 89.4 g of bismuth oxide $Bi_2O_3$ (industrial use), 116.2 g of neodymium oxide $Nd_2O_3$ (industrial use), and 52.1 g of aluminum hydroxide $Al(OH)_3$ (first class reagent) were prepared. The raw materials were mixed with an FM Mixer, produced by Mitsui Miike Machinery Co., Ltd., so as to provide a raw material mixture. Co corresponds to the divalent Fe site substitution element, and Ti corresponds to the tetravalent Fe site substitution element.

The raw material mixture was placed in a pelletizer, granulated by molding into a spherical shape while spraying water thereon, and then dried at 270° C. for 14 hours to provide a granulated product having a particle diameter of 1 to 50 mm. The obtained granulated product was melted with a platinum crucible in a melting furnace. The raw material substances were completely melted by heating to 1,400° C. and then retained for 60 minutes under agitation. The molten product (hot melt) was discharged from a nozzle to quench by an atomization method, resulting in an amorphous material. The resulting amorphous material was crystallized by firing under condition of heating and retaining at 630° C. for 60 minutes, so as to form hexagonal ferrite.

The powder obtained by firing contained a residual substance mainly containing barium borate, in addition to the hexagonal ferrite. The powder was immersed in a 10% by mass acetic acid aqueous solution heated to 60° C. and retained therein under agitation for 1 hour, so as to dissolve the residual substance in the solution, and then the solid matter was recovered by performing solid-liquid separation through filtration. The solid matter is referred to as a "solid matter after pickling".

The solid matter after pickling was cleaned with pure water to remove the components including acetic acid and the like attached to the surface of the crystal particles. The water cleaning was repeated until the conductivity of the cleaned liquid (filtrate) became 10 μS/cm or less. After the water cleaning, the solid matter was dried in air at 110° C., so as to provide a specimen of Bi-containing hexagonal ferrite magnetic powder. The specimen corresponds to the "original powder" used in Examples 1 to 6 described later.

(Composition Analysis of Magnetic Powder)

The composition analysis of the hexagonal ferrite magnetic powder specimen was performed by using an inductively coupled plasma emission spectrometer ICP (720-ES), produced by Agilent Technologies, Inc. The composition of the metal elements was calculated in terms of molar ratio with respect to Fe from the resulting quantitative values. The composition of the magnetic powder specimen obtained in this example (i.e., the "original powder" used in Examples 1 to 6 described later) was calculated to have 50.0% by mass of Fe, 7.12% by mass of Bi, and a Bi/Fe molar ratio of 0.038.

(Measurement of Magnetic Characteristics)

The hexagonal ferrite magnetic powder specimen was charged in a resin vessel having a diameter of 6 mm, and measured for the coercive force Hc, the saturation magnetization σs, the squareness ratio SQ, and the coercive force distribution SFD, by using a VSM device (VSM-P7-15), produced by Toei Industry Co., Ltd., at an external magnetic field of 795.8 kA/m (10 kOe) and a magnetic field sweep speed of 795.8 kA/m/min (10 kOe/min). As a result, the magnetic powder specimen obtained in this example (i.e., the "original powder" used in Examples 1 to 6 described later) had a coercive force Mc of 174 kA/m, a saturation magnetization σs of 41.1 Am²/kg, a squareness ratio SQ of 0.513, and a coercive force distribution SFD of 0.764.

(Measurement of BET Specific Surface Area)

The hexagonal ferrite magnetic powder specimen was measured for the specific surface area by the BET one-point method by using 4 Sorb US, produced by Uasa Ionics Co., Ltd. As a result, the magnetic powder specimen obtained in this example (i.e., the "original powder" used in Examples 1 to 6 described later) had a BET specific surface area of 101.1 m²/g.

(Measurement of Dx Volume)

The crystallite diameter Dxc (nm) in the c axis direction of the hexagonal ferrite crystal lattice and the crystallite diameter Dxa (nm) in the a axis direction thereof were obtained with an X-ray diffraction device (Ultima IV, produced by Rigaku Corporation using a Cu tube, according to the expression (5). The crystallite diameters were measured by scanning in a range of 2θ of 20.5 to 25° for Dxc and 2θ of 60 to 65° for Dxa. The measurement method was a continuous measurement method, the sampling distance was 0.05° for Dxc and 0.02° for Dxa, the scanning speed was 0.1°/min for Dxc and 0.4°/min for Dxa, and the cumulated number was 1. The measured values of Dxc and Dxa were substituted into the expression (1) to provide the Dx volume. The magnetic powder specimen obtained in this example (i.e., the "original powder" used in Examples 1 to 6 described later) had a Dx volume of 1,690 nm³.

These results are shown in Table 2.

Example 1

The hexagonal ferrite magnetic powder obtained in Control Example was used as the original powder and subjected to the following Bi elution treatment.

(Bi Elution Treatment)

Disodium ethylenediaminetetraacetate dihydrate (reagent, produced by Dojindo Laboratories Co., Ltd.), a chelating agent, was prepared as the compound X forming a complex with Bi. This chelating agent has a log $K_{Bi}$–log $K_{Fe}$ value of 2.8.

In a 1 L beaker, 793.2 g of pure water, 16.8 g of the chelating agent, and 16.0 g of an acetic acid aqueous solution having a concentration of 90% by mass were mixed to provide a solution having dissolved therein the chelating agent (which is hereinafter referred to as a "chelating agent solution"). The temperature of the chelating agent solution was regulated to 60° C., and then 90 g of the hexagonal ferrite magnetic powder (original powder) obtained in Control Example was placed in the chelating agent solution and immersed in the solution. The solution was retained to 60° C. for 6 hours under agitation to provide a slurry containing the magnetic powder. In this immersion condition, the value of N×$A_k$/$A_{Bi}$, the left member of the expression (4), was 1.5. The pH of the liquid at the start of immersion was 3.6, and the pH of the liquid at the completion of the immersion after agitating and retaining for 6 hours was 4.8. The resulting slurry was filtered to recover the solid matter. The Bi elution treatment was completed in the aforementioned manner. The recovered solid matter was cleaned with pure water to remove the components including the chelating agent and the like attached to the surface of the particles. The solid matter after cleaning was dried at 110° C. in air to provide a specimen of hexagonal ferrite magnetic powder having been subjected to the Bi elution treatment (treated powder).

The resulting magnetic powder specimen (treated powder) was measured in the same manner as in Control Example. As a result, the magnetic powder specimen obtained in this example was calculated to have 51.2% by mass of Fe, 4.37% by mass of Bi, and a Bi/Fe molar ratio of 0.023. The Bi residual ratio according to the expression (3) was 0.023/0.038≈0.61, from which it was confirmed that the Bi content was largely decreased by the Bi elution treatment. The magnetic powder specimen (treated powder) obtained in this example had a coercive force Hc of 182 kA/m, a saturation magnetization σs of 42.0 Am²/kg, a squareness ratio SQ of 0.517, and a coercive force distribution SFD of 0.692. The BET specific surface area thereof was 104.6 m²/g, and the Dx volume thereof was 1,750 nm³. The results are shown in Table 2 (which is the same as in the examples blow).

Example 2

The hexagonal ferrite magnetic powder obtained in Control Example was used as the original powder and subjected to the Bi elution treatment. In this example, experiments were performed in the same manner as in Example 1 except that the amount of the chelating agent (disodium ethylenediaminetetraacetate dihydrate) added was changed to make a value of N×$A_k$/$A_{Bi}$, the left member of the expression (4), of 2.0. The pH of the liquid at the start of immersion was 3.6, and the pH of the liquid at the completion of the immersion after agitating and retaining for 6 hours was 4.5.

The magnetic powder specimen (treated powder) obtained in this example was calculated to have a Bi/Fe molar ratio of 0.019. The Bi residual ratio according to the expression (3) was 0.019/0.038≈0.50, from which it was confirmed that the Bi content was largely decreased by the Bi elution treatment. The coercive force Hc was 184 kA/m, the saturation magnetization σs was 42.3 Am²/kg, the squareness ratio SQ was 0.519, the coercive force distribution SFD was 0.679, the BET specific surface area was 106.7 m²/g, and the Dx volume was 1,680 nm³.

Example 3

The hexagonal ferrite magnetic powder obtained in Control Example was used as the original powder and subjected to the Bi elution treatment. In this example, experiments were performed in the same manner as in Example 1 except that the amount of the chelating agent (disodium ethylenediaminetetraacetate dihydrate) added was changed to make a value of N×$A_k$/$A_{Bi}$, the left member of the expression (4), of 2.0, and the amount of the acetic acid aqueous solution having a concentration of 90% by mass added was changed from 16.0 g to 8.0 g. The pH of the liquid at the start of immersion was 4.1, and the pH of the liquid at the completion of the immersion after agitating and retaining for 6 hours was 8.2.

The magnetic powder specimen (treated powder) obtained in this example was calculated to have a Bi/Fe molar ratio of 0.023. The Bi residual ratio according to the expression (3) was 0.023/0.038≈0.61, from which it was confirmed that the Bi content was largely decreased by the Bi elution treatment. The coercive force Hc was 180 kA/m, the saturation magnetization σs was 42.1 Am²/kg, the squareness ratio SQ was 0.516, the coercive force distribution SFD was 0.699, the BET specific surface area was 104.1 m²/g, and the Dx volume was 1,680 nm³.

Example 4

The hexagonal ferrite magnetic powder obtained in Control Example was used as the original powder and subjected to the Bi elution treatment. In this example, experiments were performed in the same manner as in Example 1 except that the amount of the chelating agent (disodium ethylenediaminetetraacetate dihydrate) added was changed to make a value of $N \times A_k/A_{Bi}$, the left member of the expression (4), of 4.0, and the amount of the acetic acid aqueous solution having a concentration of 90% by mass added was changed from 16.0 g to 8.0 g. The pH of the liquid at the start of immersion was 4.2, and the pH of the liquid at the completion of the immersion after agitating and retaining for 6 hours was 7.4.

The magnetic powder specimen (treated powder) obtained in this example was calculated to have a Bi/Fe molar ratio of 0.012. The Bi residual ratio according to the expression (3) was 0.012/0.038≈0.32, from which it was confirmed that the Bi content was largely decreased by the Bi elution treatment. The coercive force Hc was 181 kA/m, the saturation magnetization σs was 43.3 Am²/kg, the squareness ratio SQ was 0.519, the coercive force distribution SFD was 0.676, the BET specific surface area was 108.0 m²/g, and the Dx volume was 1,750 nm³.

Example 5

The hexagonal ferrite magnetic powder obtained in Control Example was used as the original powder and subjected to the Bi elution treatment. In this example, experiments were performed in the same manner as in Example 1 except that the amount of the chelating agent (disodium ethylenediaminetetraacetate dihydrate) added was changed to make a value of $N \times A_k/A_{Bi}$, the left member of the expression (4), of 4.0, and the liquid temperature during the immersion was changed from 60° C. to 40° C. The pH of the liquid at the start of immersion was 3.6, and the pH of the liquid at the completion of the immersion after agitating and retaining for 6 hours was 4.3.

The magnetic powder specimen (treated powder) obtained in this example was calculated to have a Bi/Fe molar ratio of 0.019. The Bi residual ratio according to the expression (3) was 0.019/0.038≈0.50, from which it was confirmed that the Bi content was largely decreased by the Bi elution treatment. The coercive force Hc was 184 kA/m, the saturation magnetization σs was 42.3 Am²/kg, the squareness ratio SQ was 0.519, the coercive force distribution SFD was 0.668, the BET specific surface area was 105.8 m²/g, and the Dx volume was 1,660 nm³.

Example 6

The hexagonal ferrite magnetic powder obtained in Control Example was used as the original powder and subjected to the Bi elution treatment. In this example, experiments were performed in the same manner as in Example 1 except that the amount of the chelating agent (disodium ethylenediaminetetraacetate dihydrate) added was changed to make a value of $N \times A_k/A_{Bi}$, the left member of the expression (4), of 4.0, the amount of the acetic acid aqueous solution having a concentration of 90% by mass added was changed from 16.0 g to 8.0 g, and the liquid temperature during the immersion was changed from 60° C. to 40° C. The pH of the liquid at the start of immersion was 4.1, and the pH of the liquid at the completion of the immersion after agitating and retaining for 6 hours was 5.9.

The magnetic powder specimen (treated powder) obtained in this example was calculated to have a Bi/Fe molar ratio of 0.016. The Bi residual ratio according to the expression (3) was 0.016/0.038≈0.42, from which it was confirmed that the Hi content was largely decreased by the Bi elution treatment. The coercive force Hc was 184 kA/m, the saturation magnetization σs was 42.8 Am²/kg, the squareness ratio SQ was 0.521, the coercive force distribution SFD was 0.650, the BET specific surface area was 106.1 m²/g, and the Dx volume was 1,680 nm³.

TABLE 2

| | Bi elution treatment | | | | | | Hexagonal ferrite magnetic powder | | | | | | |
|---|---|---|---|---|---|---|---|---|---|---|---|---|---|
| | Compound | N × | Temperature | Time | pH | | Class of | Composition (molar ratio) | | | | | |
| Example No. | X | $A_K/A_{Bi}$ | (° C.) | (h) | Start | Completion | specimen | Ba/Fe | Bi/Fe | Co/Fe | Ti/Fe | Nd/Fe | Al/Fe |
| Control Example | — | — | — | — | — | — | Original powder | 0.080 | 0.038 | 0.009 | 0.021 | 0.006 | 0.008 |
| Example 1 | EDTA-2Na | 1.5 | 60 | 6 | 3.6 | 4.8 | Treated powder | 0.080 | 0.023 | 0.009 | 0.021 | 0.004 | 0.008 |
| Example 2 | EDTA-2Na | 2.0 | 60 | 6 | 3.6 | 4.5 | Treated powder | 0.081 | 0.019 | 0.009 | 0.021 | 0.004 | 0.007 |
| Example 3 | EDTA-2Na | 2.0 | 60 | 6 | 4.1 | 8.2 | Treated powder | 0.083 | 0.023 | 0.009 | 0.021 | 0.004 | 0.008 |
| Example 4 | EDTA-2Na | 4.0 | 60 | 6 | 4.2 | 7.4 | Treated powder | 0.082 | 0.012 | 0.010 | 0.022 | 0.003 | 0.006 |
| Example 5 | EDTA-2Na | 4.0 | 40 | 6 | 3.6 | 4.3 | Treated powder | 0.082 | 0.019 | 0.009 | 0.020 | 0.003 | 0.007 |
| Example 6 | EDTA-2Na | 4.0 | 40 | 6 | 4.1 | 5.9 | Treated powder | 0.082 | 0.016 | 0.009 | 0.020 | 0.003 | 0.007 |

| | Hexagonal ferrite magnetic powder | | | | | | | | |
|---|---|---|---|---|---|---|---|---|---|
| | Magnetic characteristics | | | | | BET specific | Crystallite diameter | | Dx | Bi |
| | Hc | | σs | | | surface area | Dxc | Dxa | volume | residual |
| Example No. | (kA/m) | (Oe) | (Am²/kg) | SQ | SFD | (m²/g) | (nm) | (nm) | (nm³) | ratio (*1) |
| Control Example | 174 | 2185 | 41.1 | 0.513 | 0.764 | 101.1 | 6.30 | 18.5 | 1690 | — |
| Example 1 | 182 | 2281 | 42.0 | 0.517 | 0.692 | 104.6 | 6.05 | 19.2 | 1750 | 0.61 |
| Example 2 | 184 | 2310 | 42.3 | 0.519 | 0.679 | 106.7 | 5.80 | 19.2 | 1680 | 0.50 |
| Example 3 | 180 | 2256 | 42.1 | 0.516 | 0.699 | 104.1 | 6.18 | 18.6 | 1680 | 0.61 |
| Example 4 | 181 | 2278 | 43.3 | 0.519 | 0.676 | 108.0 | 6.24 | 18.9 | 1750 | 0.32 |

TABLE 2-continued

| Example 5 | 184 | 2307 | 42.3 | 0.519 | 0.668 | 105.8 | 6.11 | 18.6 | 1660 | 0.50 |
| Example 6 | 184 | 2306 | 42.8 | 0.521 | 0.650 | 106.1 | 6.30 | 18.4 | 1680 | 0.42 |

(*1): (Bi/Fe molar ratio of treated powder)/(Bi/Fe molar ratio of original powder)

In the hexagonal ferrite magnetic powder of each of the examples, the Bi content of the original powder of Control Example was largely decreased by performing the Bi elution treatment. The molar ratios to Fe of Ba and the Fe site substitution element (Co and Ti) constituting the hexagonal ferrite crystal lattice were substantially not changed before and after the Bi elution treatment, from which it was confirmed that the preferential elution of Bi was achieved. The Dx volume of the original powder was substantially retained even after the Bi elution treatment. On the other hand, the saturation magnetization σs was enhanced by the Bi elution treatment.

For reference, experimental results are briefly described, which show the changes of the Dx volume and the saturation magnetization in the case where raw material mixtures having Bi/Fe molar ratios in the charged composition changed to three cases, 0.001, 0.010, and 0.040, respectively, were produced, with which hexagonal ferrite magnetic powder was synthesized at various firing temperatures. The experiments were performed under the substantially same condition as Control Example except for the change of the firing temperature, and Bi elution treatment was not performed.

Figure 1:
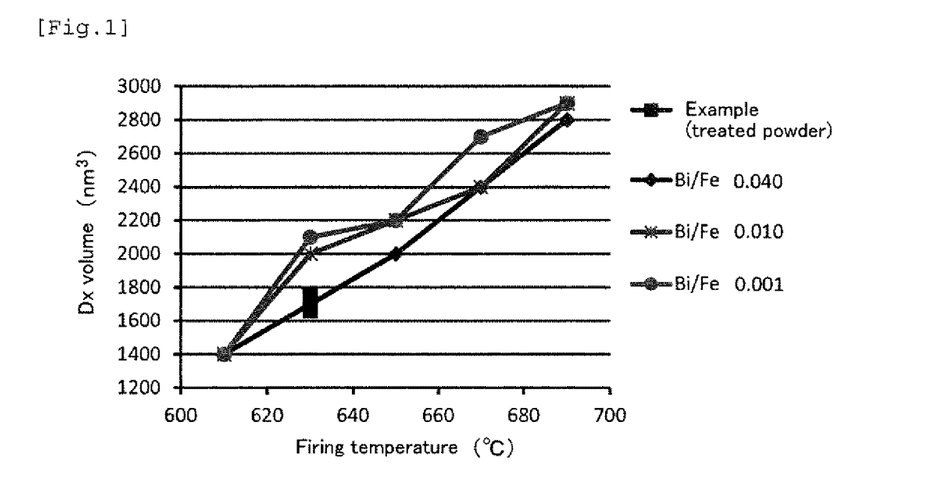
FIG. 1 is a graph showing an example of the relationship between the firing temperature and the Dx volume of the Bi-containing hexagonal ferrite magnetic powder.

FIG. 1 shows the relationship between the firing temperature and the Dx volume. Examples described above are also plotted therein.

There is a tendency that the Dx volume is decreased associated with the decrease of the firing temperature.

Figure 2:
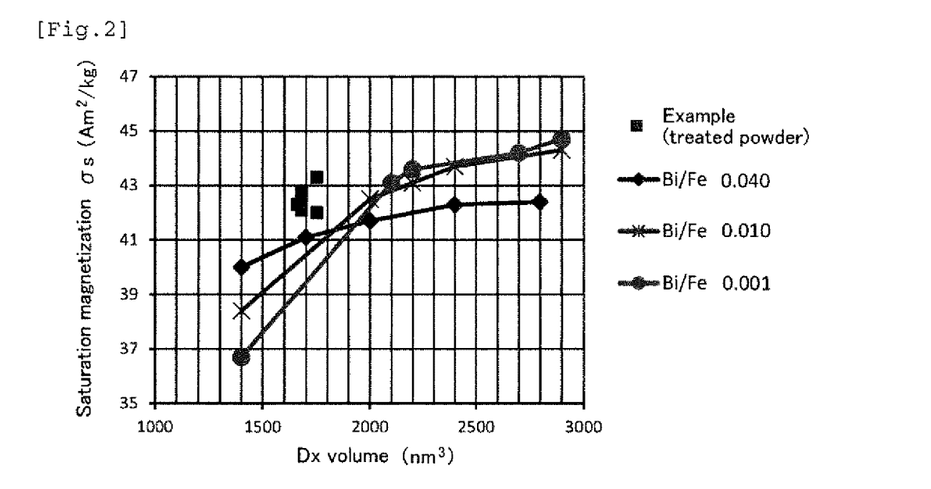
FIG. 2 is a graph showing an example of the relationship between the Dx volume and the saturation magnetization σs of the Bi-containing hexagonal ferrite magnetic powder.

FIG. 2 shows the relationship between the Dx volume and the saturation magnetization σs. Examples described above are also plotted therein. The plot on the line of Bi/Fe=0.040 near a Dx volume of 1,700 corresponds to the original powder obtained in Control Example. It is understood that the products of Examples described above having been subjected to the Bi elution treatment exhibit high σs even in the region with small Dx volumes, in which the decrease of the saturation magnetization has become conspicuous.

The invention claimed is:

1. Hexagonal ferrite magnetic powder comprising Bi at a Bi/Fe molar ratio in a range of 0.025 or less and Al, having a saturation magnetization σs of 42.0 Am$^2$/kg or more and a Dx volume represented by the following expression (1) of 1,800 nm$^3$ or less:

$$Dx \text{ volume}(nm^3) = Dxc \times \pi \times (Dxa/2)^2 \quad (1)$$

wherein Dxc represents a crystallite diameter (nm) of a hexagonal ferrite crystal lattice in a c axis direction; Dxa represents a crystallite diameter (nm) of the crystal lattice in an a axis direction; and x represents the circular constant.

2. The hexagonal ferrite magnetic powder according to claim 1, wherein the hexagonal ferrite magnetic powder comprises Bi at a Bi/Fe molar ratio in a range of 0.005 to 0.035.

3. The hexagonal ferrite magnetic powder according to claim 1, wherein a part of Fe sites of hexagonal ferrite crystals is substituted by one or more kind of a divalent, tetravalent, or pentavalent metal element.

4. The hexagonal ferrite magnetic powder according to claim 1, wherein the hexagonal ferrite magnetic powder is hexagonal Ba ferrite magnetic powder.

* * * * *